United States Patent
Gupta et al.

(10) Patent No.: US 10,110,952 B1
(45) Date of Patent: Oct. 23, 2018

(54) SYSTEMS AND METHODS FOR PROVIDING A LOW POWER MODE FOR A MEDIA GUIDANCE APPLICATION

(71) Applicant: Rovi Guides, Inc., San Carlos, CA (US)

(72) Inventors: Vikram Makam Gupta, Bangalore (IN); Vishwas Sharadanagar Panchaksharaiah, Tumkur District (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/795,190

(22) Filed: Oct. 26, 2017

(51) Int. Cl.
| | |
|---|---|
| *H04N 21/43* | (2011.01) |
| *H04N 21/442* | (2011.01) |
| *H04N 21/443* | (2011.01) |
| *H04N 21/45* | (2011.01) |
| *H04N 21/462* | (2011.01) |
| *H04N 21/466* | (2011.01) |
| *H04N 21/435* | (2011.01) |

(52) U.S. Cl.
CPC ....... *H04N 21/4436* (2013.01); *H04N 21/435* (2013.01); *H04N 21/4621* (2013.01); *H04N 21/4667* (2013.01)

(58) Field of Classification Search
CPC ............. H04N 21/43; H04N 21/44222; H04N 21/4436; H04N 21/4532; H04N 21/4621; H04N 21/466
USPC .......................................... 725/9, 14, 34, 87
See application file for complete search history.

(56) References Cited

U.S. PATENT DOCUMENTS

| | | |
|---|---|---|
| 6,044,443 A | 3/2000 | Kim |
| 6,239,794 B1 | 5/2001 | Yuen et al. |
| 6,564,378 B1 | 5/2003 | Satterfield et al. |
| 7,165,098 B1 | 1/2007 | Boyer et al. |
| 7,624,416 B1 * | 11/2009 | Vandermolen ......... H04H 60/33 709/203 |
| 7,761,892 B2 | 7/2010 | Ellis et al. |
| 8,046,801 B2 | 10/2011 | Ellis et al. |
| 9,319,856 B1 | 4/2016 | Riggs |
| 2002/0174430 A1 | 11/2002 | Ellis et al. |
| 2005/0050578 A1 | 3/2005 | Ryal |
| 2005/0251827 A1 | 11/2005 | Ellis et al. |
| 2007/0288777 A1 | 12/2007 | Schutte |
| 2009/0113472 A1 | 4/2009 | Sheth et al. |
| 2009/0290856 A1 | 11/2009 | McCarthy et al. |
| 2010/0064314 A1 | 3/2010 | Li et al. |
| 2010/0153885 A1 | 6/2010 | Yates |

(Continued)

*Primary Examiner* — Dominic D Saltarelli
(74) *Attorney, Agent, or Firm* — Haley Guiliano LLP

(57) ABSTRACT

Systems and methods are provided herein for performing user device power conservation. To this end, the systems and methods operate a user device in a normal operation mode to provide media content to the user device. While operating in the normal operation mode, Systems and methods monitor the provided media content to determine that the provided media content includes an event that is of interest to the user. In response to determining that the provided media content includes an event of interest to the user, systems and methods enter an enhanced mode. In the enhanced mode, systems and methods determine that an enriched media content is relevant to the provided media content. In response to determining that the enriched media content is relevant to the provided media, systems and methods provide the enriched media content to the user device.

20 Claims, 11 Drawing Sheets

(56) References Cited

U.S. PATENT DOCUMENTS

| | | | |
|---|---|---|---|
| 2010/0251305 A1* | 9/2010 | Kimble | H04N 7/17318 |
| | | | 725/46 |
| 2011/0004651 A1 | 1/2011 | Tuli | |
| 2012/0054785 A1 | 3/2012 | Yang et al. | |
| 2015/0163530 A1 | 6/2015 | Bayer et al. | |
| 2017/0099592 A1 | 4/2017 | Loeb et al. | |

* cited by examiner

SYSTEMS AND METHODS FOR PROVIDING A LOW POWER MODE FOR A MEDIA GUIDANCE APPLICATION

BACKGROUND

A typical television system usually operates in a single type of a power mode. Typically, such a television system would perform all monitoring operations at all times. For example, the system may check whether a media storage device is at full capacity, or close to full capacity at all times. Thus, the television system may present "storage full" message at inopportune times (for example during a key movie scene), creating a poor user experience. Alternatively, a typical system may never routinely check whether a media storage is at full capacity. In such cases, the error messages will be generated only when a user tries to record a video to the media storage device. Such messages similarly create a poor user experience.

Furthermore, typical television systems may monitor media content that is currently being delivered to a user for an opportunity to present enriched media content. However, such persistent monitoring is computationally intensive, and significantly increases power demand of the television system. In addition, such monitoring is often futile, because, often, a user may be simply uninterested in any kind of enhanced enriched media content related to the media content that is being presently delivered.

SUMMARY

To this end and others, in some embodiments, a media guidance application monitors storage space associated with a media storage device to determine whether an amount of storage space available is less than a threshold. For example, the media storage device may be a user's Digital Video Recorder (DVR), and the threshold may be 10% or less of DVR storage being available. In some embodiments, the media guidance application may enter a deletion mode in response to determining the amount of storage space available is less than the threshold. For example, if the media guidance application determines that the user's DVR is 95% full (that is, only 5% of the DVR memory is available), while the threshold is 10% or less of DVR storage being available, the media guidance application may enter a deletion mode.

In some embodiments, the media guidance application may monitor user interactions between a user and a user device after entering the deletion mode. For example, in the deletion mode, the media guidance application may determine that: (1) displayed media content, is on an advertisement break; and/or (2) a user is plainly surfing channels and has not found anything interesting to watch. The media guidance application may use such determinations to determine that it is an appropriate time to display notifications to the user. For example, if the user is plainly surfing channels, displaying a notification will not interrupt the user from watching something interesting. In some embodiments, the media guidance application may generate for display a notification at an appropriate time, based on the monitored user interactions. For example, at the appropriate time, the media guidance application may remind the user that the DVR is almost full. In some embodiments, the media guidance application may further prompt the user to delete some recording from the DVR.

In some embodiments, the media guidance application may operate by entering a normal operation mode. For example, the normal operation mode may be a lower-power mode during which he media guidance application only performs a limited set of operations, such as basic operations of the user's television equipment. During the normal operation mode, a first set of operations may be performed. In some embodiments, the first set of operations comprises setting a storage threshold associated with a media storage device. For example, media storage device may be the user's Digital Video Recorder (DVR), and the threshold may be 10% or less of DVR storage being available. In some embodiments, the first set of operations comprises monitoring storage space associated with the media storage device to determine whether an amount of storage space available in the media storage device is less than the storage threshold. For example, if the threshold is 10% or less of DVR storage being available, the media guidance application may dynamically check if the DVR has more or less than 10% of its stage available.

In some embodiments, media guidance application may enter a deletion mode in response to determining that the amount of storage space available in the media storage device is less than the set storage threshold. For example, if the threshold is 10% or less of DVR storage being available, and the media guidance application determines that 8% of the DVR storage is available, the media guidance application may enter the deletion mode. In some embodiments, during the deletion mode, the first set of operations and an additional set of operations is performed by the media guidance application. For example, the media guidance application may perform more power-intensive operations in the deletion mode. For example, the media guidance application may begin logging user interactions between a user and a user device. In some embodiments, the media guidance application may log user input received via a remote control, a smart mobile phone, or any other device.

In some embodiments, the additional set of operations may include dynamically comparing the logged user interactions against a plurality of stored user interaction templates to generate a plurality of respective user interaction scores. For example, the media guidance application may store templates that identify typical user behavior during certain situations related to media content. For example, the templates may identify typical user input that is expected to be received during certain situations, e.g., user aimlessly browsing channels, user watching a TV commercial, etc.

In some embodiments, the additional set of operations may include the media guidance application determining an appropriate time to notify the user of the amount of storage space available in the media storage device in response to determining that at least one of the plurality of respective user interaction scores corresponds to a respective threshold. For example, if the logged user interactions sufficiently match expected user input while user is aimlessly channel surfing, the media guidance application may determine that the current time is an appropriate time to notify the user of the amount of storage space available in the media storage device. For example, the media guidance application may determine that the user is currently likely to be receptive to system prompts and notifications.

In some embodiments, the additional set of operations may include the media guidance application generating for display at the appropriate time, a notification that indicates to the user the amount of storage space available in the media storage device. For example, the media guidance application may notify a user that the DVR is almost full at the time at which the user is likely to be responsive to such prompts, for example, when the user is aimlessly browsing the channels.

In some embodiments, the plurality of stored user interaction templates may comprise a user interaction template that represents expected user interactions of a user who is engaged in channel surfing. In some embodiments, the plurality of stored user interaction templates may comprise a user interaction template that represents expected user interactions of a user who is not interested in media content that is currently being shown on the user device. In some embodiments, the plurality of stored user interaction templates may comprise a user interaction template that represents expected user interactions of a user who is watching an advertisement. In some embodiments, the plurality of stored user interaction templates may comprise any of the aforementioned templates, any other template, or any combination thereof.

In some embodiments, determining the appropriate time to notify the user of the amount of storage space available in the media storage device may be performed by the media guidance application by generating a timestamp at the time when at least one of the plurality of respective user interaction scores is determined to correspond to a respective threshold. The media guidance application may further determine that a time associated with the timestamp represents a time at which the user is likely to respond to a solicitation to delete at least one recording from the media storage device. For example, if the user is determined to be merely browsing channels at a certain time, the media guidance application may determine that the user, at that time, is likely to respond to system prompts. The media guidance application may also store the timestamp.

In some embodiments, the media guidance application generates the notification for display by generating for display a solicitation to delete at least one recording from the media storage device. For example, the media guidance application may prompt the user to delete some identified DVR content. In some embodiments, the media guidance application may delete the at least one recording from the media storage device in response to receiving a confirmation from the user to delete the at least one recording from the media storage device. For example, the prompt may ask a user "Do you wish to delete Game of Thrones Season 3 Episode 2?", the prompt may include a "Yes" button and "No" button. If the user clicks the "Yes" button, the media guidance application may delete Game of Throes Season 3 Episode 2 from the DVR. In some embodiments, the media guidance application may enter the normal operation mode after deleting the Game of Thrones Season 3 Episode 2 form the DVR.

In some embodiments, the additional set of operations further performed by the media guidance application in the deletion mode may include, determining whether a new amount of storage space available in the media storage device is less than the storage threshold in response to deleting the at least one recording from the media storage device. For example, once Game of Thrones Season 3 Episode 2 is deleted from the DVR, the media guidance application may check if DVR has more than 10% of space available. In some embodiments, in response to determining that the new amount of storage space available in the media storage device is more than the set storage threshold, the media guidance application may enter the normal operation mode. In some embodiments, in response to determining that the amount of storage space available in the media storage device is less than the set storage threshold, the media guidance application may generate for display a solicitation to delete at least one other recording from the media storage device. For example, the media guidance application may display the following prompt: "Do you wish to delete Game of Thrones Season 3 Episode 3?"

In some embodiments, generating for display a solicitation to delete the at least one recording from the media storage device may comprise determining which recoding on the media storage device has the lowest priority to the user. For example, the media guidance application may determine that Game of Thrones Season 3 Episode 2 is an oldest recording stored on the DVR. In some embodiments, the media guidance application may generate for display a solicitation to delete the recording that has the lowest priority to the user. In some embodiments, generating for display a solicitation to delete a recording from the media storage device comprises generating for display a pop-up window that is overlaid over media content that is currently being shown on the user device. For example, the pop-up window may be over-laid over the video from a channel the user is currently watching.

In some embodiments, the additional set of operations may further include actions performed in response to receiving from the user a refusal to delete the at least one recording from the media storage device. For example, the user may click the "No" button when asked to delete a recording. The media guidance application may then cease to display the solicitation to delete the at least one recording from the media storage device and enter the normal operation mode for a predetermined period of time. For example, the media guidance application may remove the pop-up window from the display and enter the normal operation mode for 24 hours. During those 24 hours, the media guidance application may not present any prompts for deletion to the user.

Additionally, systems and methods are disclosed herein for performing user device power conservation. A media guidance application may operate a user device in a normal operation mode to provide media content to the user device. For example, the media guidance application may provide a video feed to the user, via a broadcast channel or via a Video-on-Demand service. While operating in the normal operation mode, the media guidance application may monitor the provided media content to determine that the provided media content includes an event that is of interest to the user. For example, the media guidance application may utilize a user profile to determine that the user is really interested in the movie being currently shown on the user device. In another example, the media guidance application may determine that exciting event is occurring in the media content shown on the user device, such as a goal being scored in a sports game. The media guidance application may enter an enhanced mode in response to determining that the provided media content includes an event of interest to the user. For example, the enhanced mode may be more power intensive. In another example, the enhanced mode may allow the media guidance application to provide additional service to the user. In some embodiments, in the enhanced mode, the media guidance application may determine that an enriched media content is relevant to the provided media content. For example, an interactive quiz may be relevant to a TV show that the user is watching. In some embodiments, the media guidance application may provide the enriched media content to the user device, in response to determining that the enriched media content is relevant to the provided media content. For example, the interactive quiz may be shown to the user overlaid over the TV Show.

In some embodiments, the media guidance application may enter a normal operation mode. For example, the normal operation mode may be low-power where only some services are provided to the user by the media guidance application. During the normal operation mode, a first set of operations may be performed by the media guidance application.

In some embodiments, the media guidance application, in the normal operation mode, may store a plurality of media content templates indicative of media content events that are of interest to a user. For example, the templates may include features of a media content that the user may find interesting. For example, if a user is interested in sports, the templates may include a template that includes features of a sports media content. The templates may include video characteristics, video metadata, and any other information about the media content.

In some embodiments, the media guidance application may provide media content to the user device. For example, a video may be provided to the user device via a broadcast channel or via a VOD system. For example, the media guidance application may provide a movie, a sports event, or a TV episode to the user device.

In some embodiments, the media guidance application may monitor the provided media content by dynamically comparing the provided media content to the plurality of stored media content templates to generate a plurality of respective interest scores. For example, the media guidance application may compare features of the provided media to features expected to be present in a media content that depicts a sports game, or to features expected from a media content that depicts an action movie. If the features of the provided media are similar to features of a sports video, a high "sports" interest score may be generated by the media guidance application. If the features of the provided media are similar to features of an action movie, a high "action movie" interest score may be generated by the media guidance application.

In some embodiments, the media guidance application may, in the normal operation mode, dynamically compare each of the plurality of the respective interest scores to a respective threshold. For example, the media guidance application may check if the "sports" interest score and the "action movie" interest score correspond to their respective thresholds. In some embodiments, the media guidance application may enter an enhanced mode in response to determining that at least one interest score of the plurality of interest scores correspond to the respective threshold. For example, if the "sports" interest score meets its threshold, the media guidance application may enter the enhanced mode.

In some embodiments, the media guidance application may perform, in the enhanced mode, the first set of operations that are also performed in the normal operation mode, and an additional set of operations. In some embodiments, the additional set of operations may include maintaining an enriched content database, wherein each entry in the enriched content database comprises associated metadata. For example, the enriched content database may include a list of supplemental information and interactive activities that are tagged with appropriate metadata. For example, the enriched content database may include supplemental information related to Game of Thrones TV show series. In another example, the enriched content database may include an interactive game related to football.

In some embodiments, the media guidance application may, in the enhanced mode, compare metadata associated with the provided media content with metadata of at least one entry in the enriched content database. For example, if a Game of Thrones episode is being shown, metadata relating to that episode may be compared to metadata of database entries. In some embodiments, the media guidance application may provide enriched media content associated with that database entry to the user device in response to determining that the metadata associated with the provided media content matches the metadata of at least one entry in the enriched content database. For example, if a Game of Thrones episode is being shown, that episode's metadata may match metadata of supplemental information related to Game of Thrones TV show series. In that case, the media guidance application may provide for display that supplemental information alongside, or overlaid over, the shown Game of Thrones episode.

In some embodiments, the plurality of stored media content templates may comprise a media content template that represents expected media content characteristics during a key portion of sports event. In some embodiments, the plurality of stored media content templates may comprise a media content template that represents expected media content characteristics during a dramatic point of a media asset. In some embodiments, he plurality of stored media content templates may comprise the aforementioned templates, any other template, or any combination thereof.

In some embodiments, the operations in the enhanced mode expend more power than operations in the normal operation mode. For example, in normal mode the media guidance application may not compare metadata associated with the provided media content with metadata of at least one entry in the enriched content database, and may not provide enriched media content associated with that database entry to the user device, thus saving power.

In some embodiments, storing a plurality of media content templates indicative of media content events that are of interest to a user comprises the media guidance application receiving, from user, criteria of interest in media content. The media guidance application may generate at least one media content template based on the received criteria of interest in media content in response to receiving the criteria of interest in media content from the user. For example, the user may indicate interest in sports. The media guidance application may then generate and store a content template that represents expected media content characteristics during a sports event. The media guidance application may then store the generated template.

In some embodiments, comparing the provided media content to the plurality of stored media content templates by the media guidance application comprises extracting video, audio, and metadata characteristics of the provided media content. For example, the media guidance application may analyze the color, speed, detail, or any other characteristics of the video and audio of the provided media content. The media guidance application may also extract all available metadata. Such as title, length, actors, year of production, etc. The media guidance application may then compare the extracted video, audio, and metadata characteristics of the provided media content to respective video, audio, and metadata characteristics of each of the plurality of stored media content templates. For example, color, speed, detail, or any other characteristics of the video and audio of the may be compared to color, speed, detail, or any other characteristics of the video and audio of the templates. Similarly, metadata of the provided media content may be compared to the metadata of the templates. In some embodiments, the media guidance application may then generate an interest score based on the comparison. For example, the better the match, the higher the score may be generated by the media guidance application.

In some embodiments, the entries of the enriched content database comprise enriched media content that provides additional information relating to the provided media content. In some embodiments, the entries of enriched content database comprise enriched media content that provides interactive user experience relating to the provided media content. In some embodiments, the entries of enriched content database comprise any of the aforementioned templates, any other template, or any combination thereof.

In some embodiments, the additional set of operations further comprises the media guidance application activating at least one secondary user device that was powered off during the normal operation mode. For example, the media guidance application may activate at least one of a digital video recorder, a video camera, and a network connectivity device. For example, the media guidance application may power on an use a DVR to provide enriched media content in the enhanced mode. In another example, the media guidance application may turn on a network appliance to access the Internet or another network to receive enriched media content. In some embodiments, the media guidance application may increase the resolution of the user device in the enhanced mode. For example, the media guidance application may increase the resolution of user's TV screen from 720p to HD 1080p or 4K resolution.

In some embodiments, in the enhanced mode, the media guidance application may monitor user interactions to determine that the user has completed an interaction with the provided enriched media content. For example, the media guidance application may determine that the user has read additional supplemental content, or has completed the provided interactive content. In some embodiments, the media guidance application may determine that the user has failed to interact with the enhanced media for some predetermined time period. In some embodiments, the media guidance application may enter the normal operation mode in response to determining that the user has completed the interaction with the provided enriched media content. For example, if the media guidance application has determined that the user has read all provided supplemental information, the media guidance application may stop providing the enhanced media content and enter the normal operation mode.

In some embodiments, the additional set of operations performed by the media guidance application may include monitoring user interactions with the provided enriched media content and creating a new media content template based on the monitored user initiations. For example, the media guidance application may determine that the user spent extra time interacting with the enriched media content relating to an action movie. The media guidance application may then create a new media content template that represents expected media content characteristics during an action movie. The media guidance application may then store the newly created template.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
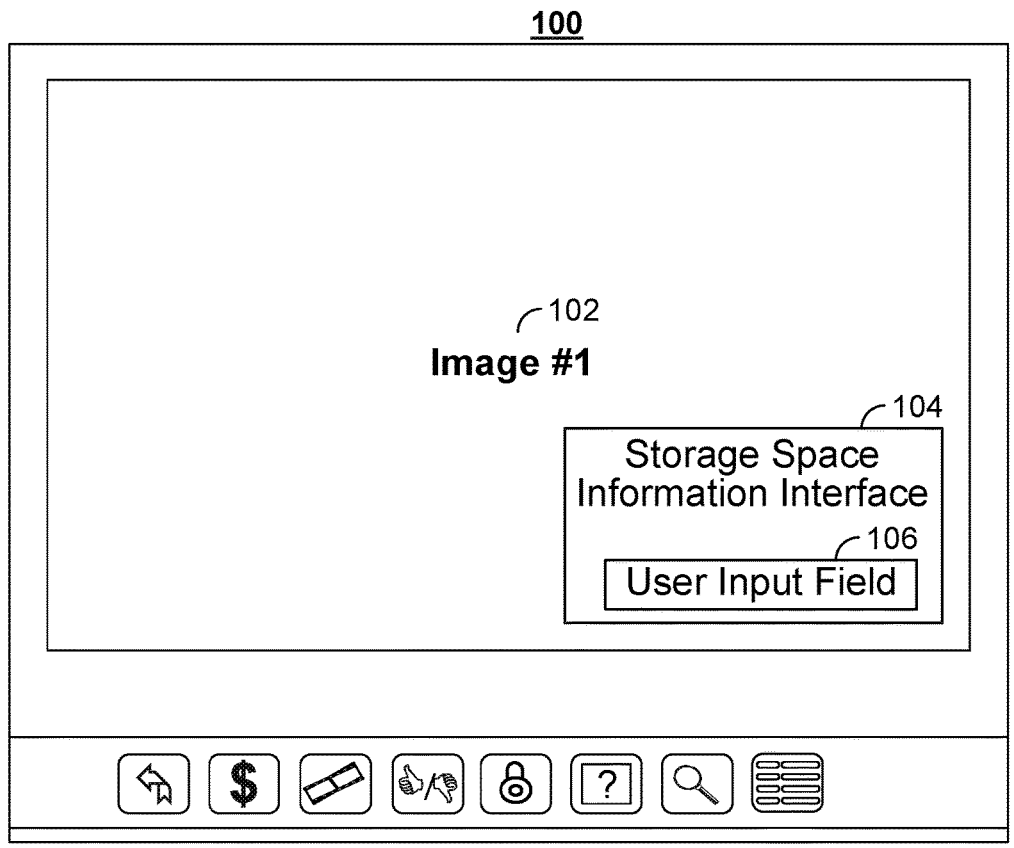
FIG. 1A shows an illustrative media guidance interface that may dynamically include or exclude a video, in accordance with some embodiments of the disclosure.

Systems and methods are disclosed herein for an improved method of indicating an amount of storage space available in a user storage device, such as a DVR. A media guidance application may determine that a media storage device is getting full. At that point, the media guidance application may begin monitoring user interactions to find an appropriate time to prompt the user to free up space on the media storage device. For example, the media storage device may determine that the user is plainly surfing channels, that the user is viewing a commercial break, or that the user is viewing a game break in a sports game. Once the media guidance application determines that it is the appropriate time, the media guidance application may unobtrusively remind the user that media storage device is getting full, and prompt the user to delete some older content. Consequently, media guidance application improves user experience, by only showing warnings and prompts at times when the user is likely to be receptive.

Additionally, systems and methods are disclosed herein for conserving power use by user television equipment. Media guidance application may operate in a normal operation mode (with relatively low power consumption) while performing only a limited set of possible operations. In the normal mode, the media guidance application may provide media content to the user. The media guidance application may monitor the provided media content to determine whether it contains events that the user may find of interest. Once such events of interest are identified, the media guidance application may enter am enhanced mode (with relatively high power consumption). In the enhanced mode, the media guidance application may perform an expanded set of possible operations. For example, the media guidance application may begin checking whether enhanced media content is available to the user. If such enhanced media content is available, the system may present it to the user. Once the user is done with the enhanced media content, the media guidance application may return to the normal mode. Consequently, user television equipment only operates in enhanced mode when necessary (for example when a user is likely to be receptive to receiving enhanced media content), which lowers the overall power consumption.

As referred to herein, the phrase "normal operation mode" refers to a mode that a device (or a module of a device), can operate in, where that device or module provides limited or constrained functionality. For example, certain advanced features may be disabled or not available in the normal operation mode. In some embodiments, the device or the module may consume relatively low amount of power when operating in the normal operation mode.

As referred to herein, the phrase "enhanced mode" refers to a mode that a device (or a module of a device), can operate in, where that device or module provides increased or additional functionality. For example, certain advanced features that may be otherwise disabled or not available, may be enabled or made available in the enhanced mode. In some embodiments, the device or the module may consume relatively high amount of power when operating in the normal operation mode.

As referred to herein, the phrase "deletion mode" refers to a mode that a device (or a module of a device), can operate in, where that device or module provides a user with a capability to delete stored data. For example, deletion features that may be otherwise disabled or not available, may be enabled or made available in the deletion mode. In some embodiments, the deletion mode may be a type of enhanced mode. In some embodiments, the device or the module may consume relatively high amount of power when operating in the deletion mode.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1A shows an illustrative media guidance interface on a display screen that may dynamically include or exclude a video. display 100 shows a media guidance interface for video presentation and system prompts. In some embodiments, display 100 may display media content provided by the media guidance application. For example, display 100 may display image 102. Image 102 may be a part of media content provided by the media guidance application. In some embodiments, the media guidance application may provide the media content to display 100 during a normal operation mode that has a lower power consumption requirement.

In some embodiments, display 100 may include Storage Space Information Interface 104. In some embodiments, Storage Space Information Interface 104 may only be displayed during a deletion mode. In some embodiments, in the normal operation mode, the media guidance application may monitor storage space associated with a media storage device. Once the media guidance application determines that the media storage is close to full, or corresponds to certain threshold of available storage, the media guidance application may enter a deletion mode.

While in deletion mode, the media guidance application may dynamically monitor user interactions to determine an appropriate time to display Storage Space Information Interface 104. For example, the media guidance application may compare user interactions with a set of stored user interactions templates to generate respective user interactions stores. In some embodiments, the user interaction templates may comprise templates that represents expected user interactions of a user who is: watching an advertisement break, surfing channels because he has not found anything interesting to watch, watching unimportant or boring scenes of a movie or TV show, watching a sports game that is on a temporary break, watching a dialog oriented scene while being an action fan, or watching an irrelevant song in a musical movie. The respective user interaction scored may be based on how closely does the monitored user interactions match the expected user interactions of the templates.

In some embodiments, the media guidance application may determine that at least one of the respective user interaction scores corresponds to a respective threshold. For example, a user's "aimless surfing" interaction score matching its threshold may indicate high likelihood that the user is currently engaged in aimless surfing of TV channels. In some embodiments, the media guidance application may determine that a time when a user interaction score corresponds to its threshold is an appropriate time to display Storage Space Information Interface 104.

In some embodiments, Storage Space Information Interface 104 may be a pop-up window unobtrusively overlaid over Image 102. In some embodiments, Storage Space Information Interface 104 may include an indication of how full or empty a media storage device is. For example, the media guidance application may display the following message "DVR is 95% full" or "Only 5% of DVR space is available." In some embodiments, Storage Space Information Interface 104 may further include a solicitation for the user to delete some recorded media content. For example, Storage Space Information Interface 104 may include a prompt that reads "Delete Game of Thrones Season 3 Episode 2?" In some embodiments, Storage Space Information Interface 104 may provide a reason to delete that recorded media content. The reason may be determined by the media guidance application. For example, Game of Thrones Season 3 Episode 2 may be the oldest recording on the media storage device. In another example, the media guidance application may have determined that the user has not watched any Game of Thrones episodes for an extended period of time.

In some embodiments, Storage Space Information Interface 104 may include User Input Field 106. For example, User Input Field 106 may include buttons labeled "Yes" and "No." In some embodiments, the media guidance application may delete the recorded media content in response to user input. For example, if the user clicks the "Yes" button, the media guidance application may delete Game of Thrones Season 3 Episode 2 from the media storage device. In some embodiments, the media guidance application may then re-enter then normal operations mode. In some embodiments, if the user confirms deletion of one recorded media content, the Storage Space Information Interface 104 may be modified to refer to another recorded media content. For example, once Game of Thrones Season 3 Episode 2 is deleted, Storage Space Information Interface 104 may display the following message "Delete Game of Thrones Season 3 Episode 3?" In some embodiments, the media guidance application may repeat this process until the amount of storage space no longer corresponds to a threshold, or until the user declines to delete the recorded media content, by for example, pressing the "No" button in User Input Field 106.

In some embodiments, after deleting the recorded media content, or after receiving a refusal to delete the recorded media content, the media guidance application may re-enter the normal operation mode.

Figure 1B:
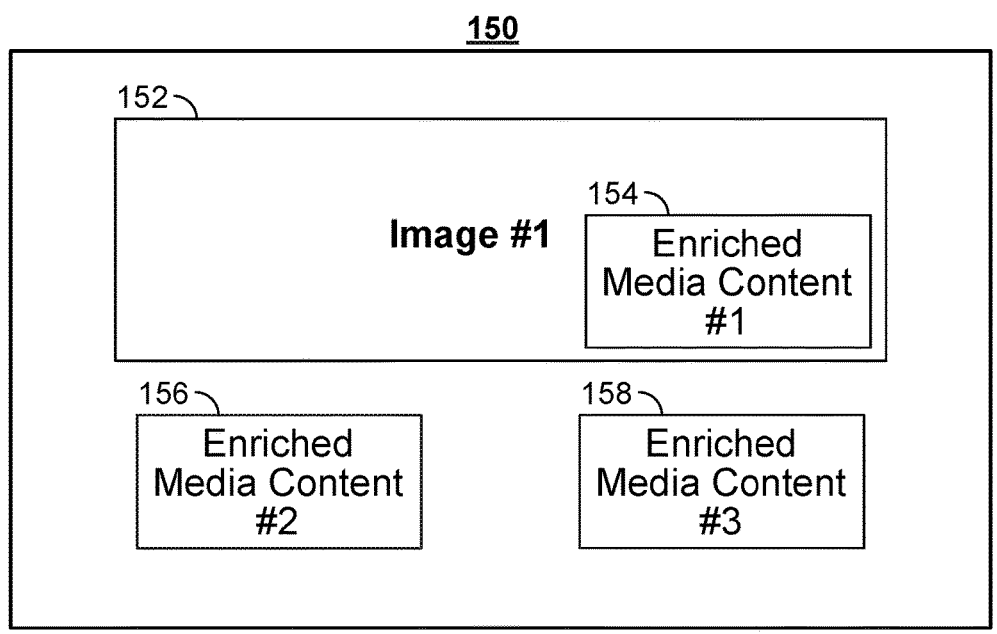
FIG. 1B shows another illustrative media guidance interface that may dynamically include or exclude a video, in accordance with some embodiments of the disclosure.

FIG. 1B shows an illustrative media guidance interface on a display screen that may dynamically include or exclude a video. display 100 shows a media guidance interface for video presentation and system prompts. In some embodiments, display 150 may display media content provided by the media guidance application. For example, display 100 may display image 152. Image 152 may be part of media content provided by the media guidance application. In some embodiments, the media guidance application may provide the media content to Display 152 during a normal operation mode that has a lower power consumption requirement. In some embodiments, the media guidance application may provide for display 100 at least one of enriched content 154, 156, 158. In some embodiments, the media guidance application may only provide at least one of enriched content 154, 156, 158 while operating in the enhanced mode.

In some embodiments, while operating in the normal operation mode, the media guidance application may store a plurality of content templates indicative of media content events that are of interest of to the user. For example, the media guidance application may store a media content template that identifies features of media content that are indicative of the media content being an action movie.

In some embodiments, the media guidance application may monitor media content provided on display 100. For example, the media guidance application may analyze image 152 to determine how well it matches an "action movie" template. The media guidance application may generate interest scores by determine how well the provided content matches the stored templates. For example, if Image 152 is typical of an action image, the media guidance application may increment the "action movie" interest score.

In some embodiments, when the media guidance application determines that at least one interest score matches a respective threshold, the media guidance application may enter an enhanced mode. In some embodiments, the enhanced mode may have a higher power consumption requirement then the normal operation mode.

In some embodiments, while in enhanced mode, the media guidance application may access the maintained database of enriched content. For example, the media guidance application may compare metadata of media content presented on display 100 with metadata of entries in the enriched content database. In some embodiments, metadata data of the media content presented on display 100 may include a title of TV show episode, names of actors, plot summary, or any other data relevant to the media content. For example, metadata data may indicate that the media content presented on display 100 is titled "Game of Thrones Season 3 Episode 2."

In some embodiments, if the metadata of at least entry of the enriched content database matches the metadata of the media content presented on display 100, the media guidance application may provide that enriched content to display 100. For example, if enriched content database has an entry related to Game of Thrones, the media guidance application may provide corresponding enriched content to display 100. In some embodiments, the media guidance application may display Enriched Content 154 overlaid over Image 152. In some embodiments, the media guidance application may display Enriched Content 156, 158 alongside Image 152. The enriched media content may comprise supplemental information related to the provided media content, interactive content related to the provided media content, or any combination of the two.

Figure 2:
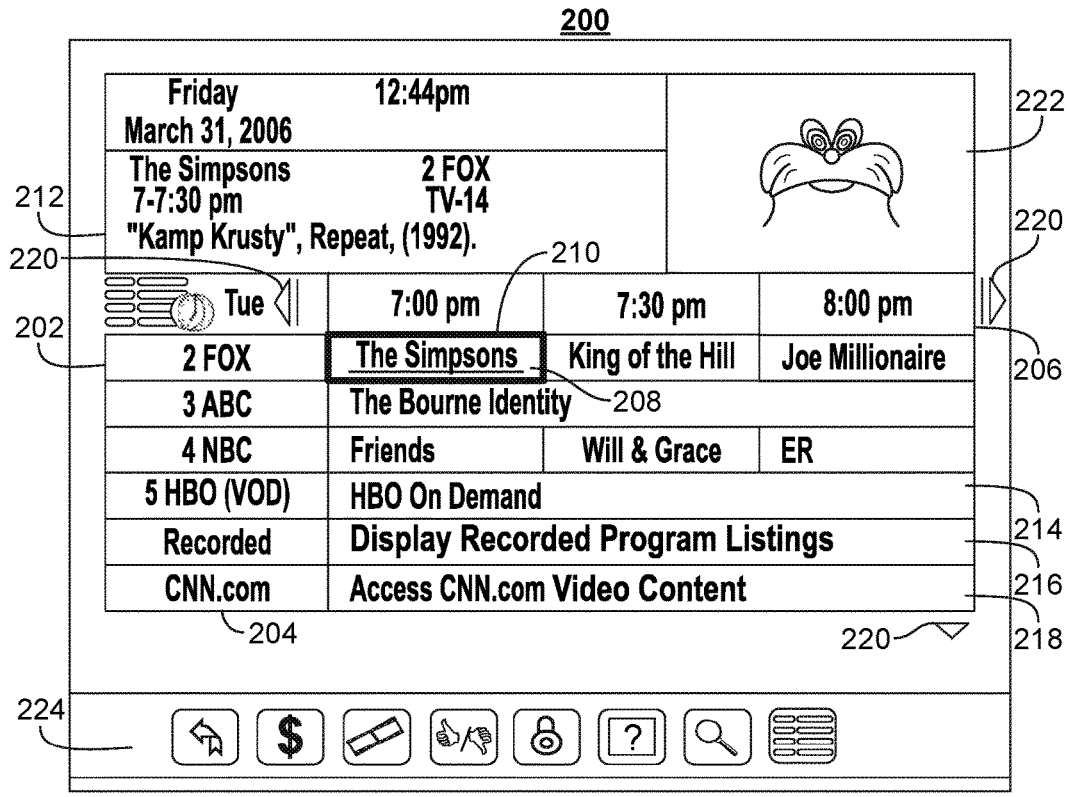
FIG. 2 shows another illustrative media guidance interface that may dynamically include or exclude a video, in accordance with some embodiments of the disclosure.
Figure 3:
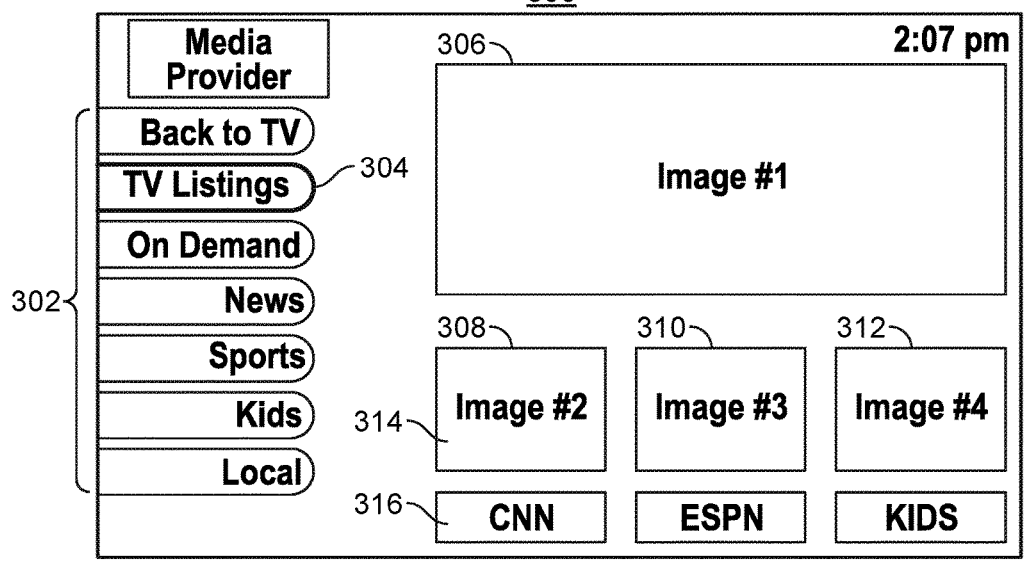
FIG. 3 shows yet another illustrative media guidance interface that may dynamically include or exclude a video, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
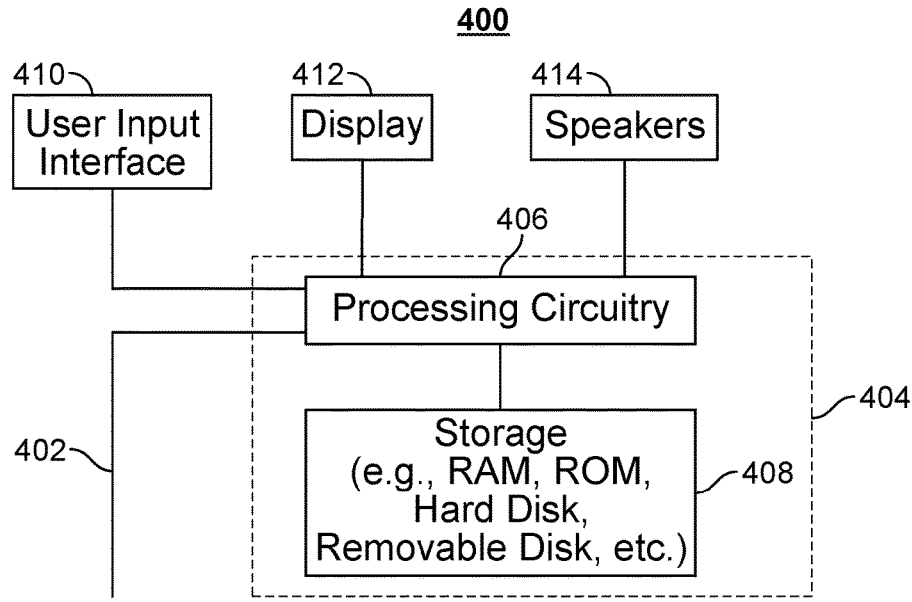
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
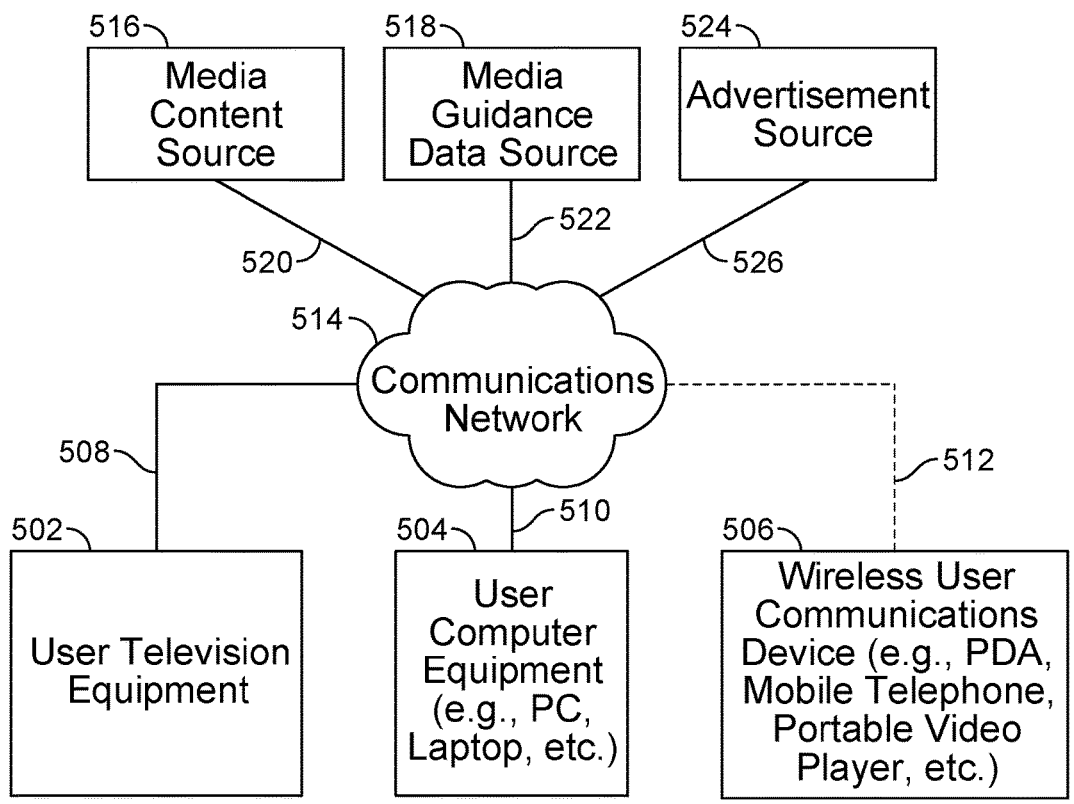
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
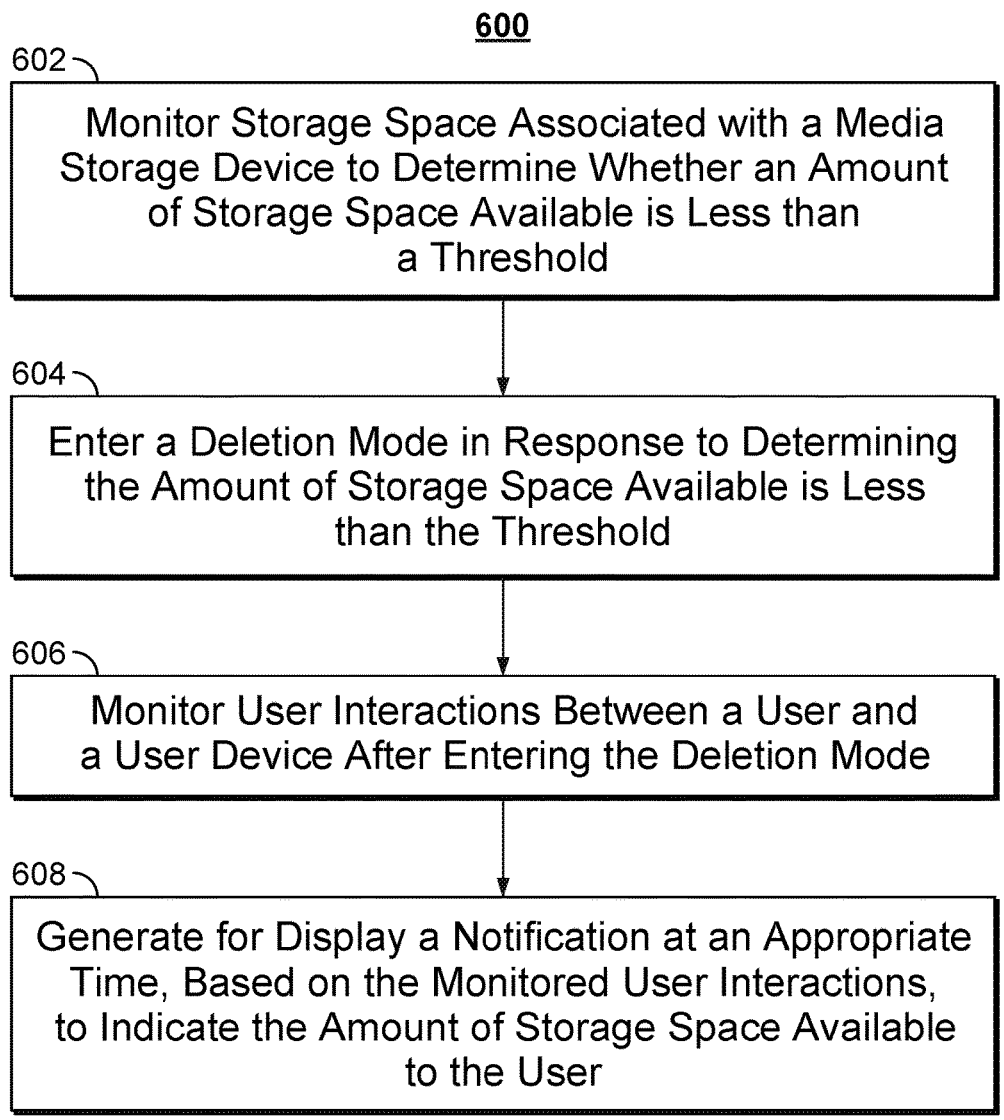
FIG. 6 depicts an illustrative flow diagram for generating for display a notification to indicate the amount of storage space available to the user in accordance with some embodiments of the disclosure.

FIG. 6 depicts an illustrative flow diagram of a process 600 for generating for display a notification to indicate the amount of storage space available to the user in accordance with an embodiment of the disclosure. Process 600 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 600 begins at 602, where control circuitry 404 monitors storage space associated with a media storage device to determine whether an amount of storage space available is less than a threshold. Media storage device may be a part of User Television Equipment 502. For example, media storage device may be a DVR device. In some embodiments, the threshold may be defined as percentage of space available on the media storage device. For example, the threshold may be 10% or less space being available on the media storage device.

Process 600 continues to 604, where in response to determining the amount of storage space available is less than the threshold, control circuitry 404 enters a deletion mode. For example, control circuitry 404 may determine that media storage device has 9% of space available, while the threshold is 10% of space being available. In some embodiments, User Television Equipment 502 may consume more power when control circuitry 404 operates in the deletion mode.

Process 600 continues to 606, where, in the deletion mode, control circuitry 404 may monitor user interactions between a user and a user device. For example, control circuitry 404 may track user input to Use Television Equipment 502, to User Computer Equipment 504, or to Wireless User Communication device 506. In some embodiments, control circuitry 404 may track user interactions with User Input Interface 410. For example, control circuitry 404 may monitor such actions as changing channels, adjusting volume, requesting new content, or any other user action.

Process 600 continues to 608, where, in the deletion mode, control circuitry 404, based on monitored user interactions, generates for display a notification at an appropriate time. In some embodiments, the appropriate time is determined based on monitored user interactions. For example, control circuitry 404 may analyze the user interactions to determine that the user is engaged in at least one of: watching an advertisement break, surfing channels because he has not found anything interesting to watch, watching unimportant or boring scenes of a movie or TV show, watching a sports game is on a temporary break, watching a dialog oriented scene while being an action fan, or watching an irrelevant song in a musical movie. For example, control circuitry 404 may determine that the current time is an appropriate time because the user is currently surfing channels because he has not found anything interesting to watch.

In some embodiments, control circuitry 404 may display a notification that indicates the amount of storage space available to the user. For example, control circuitry 404 may display a Storage Space Information Interface 104 as described in relation to FIG. 1A.

Figure 7:
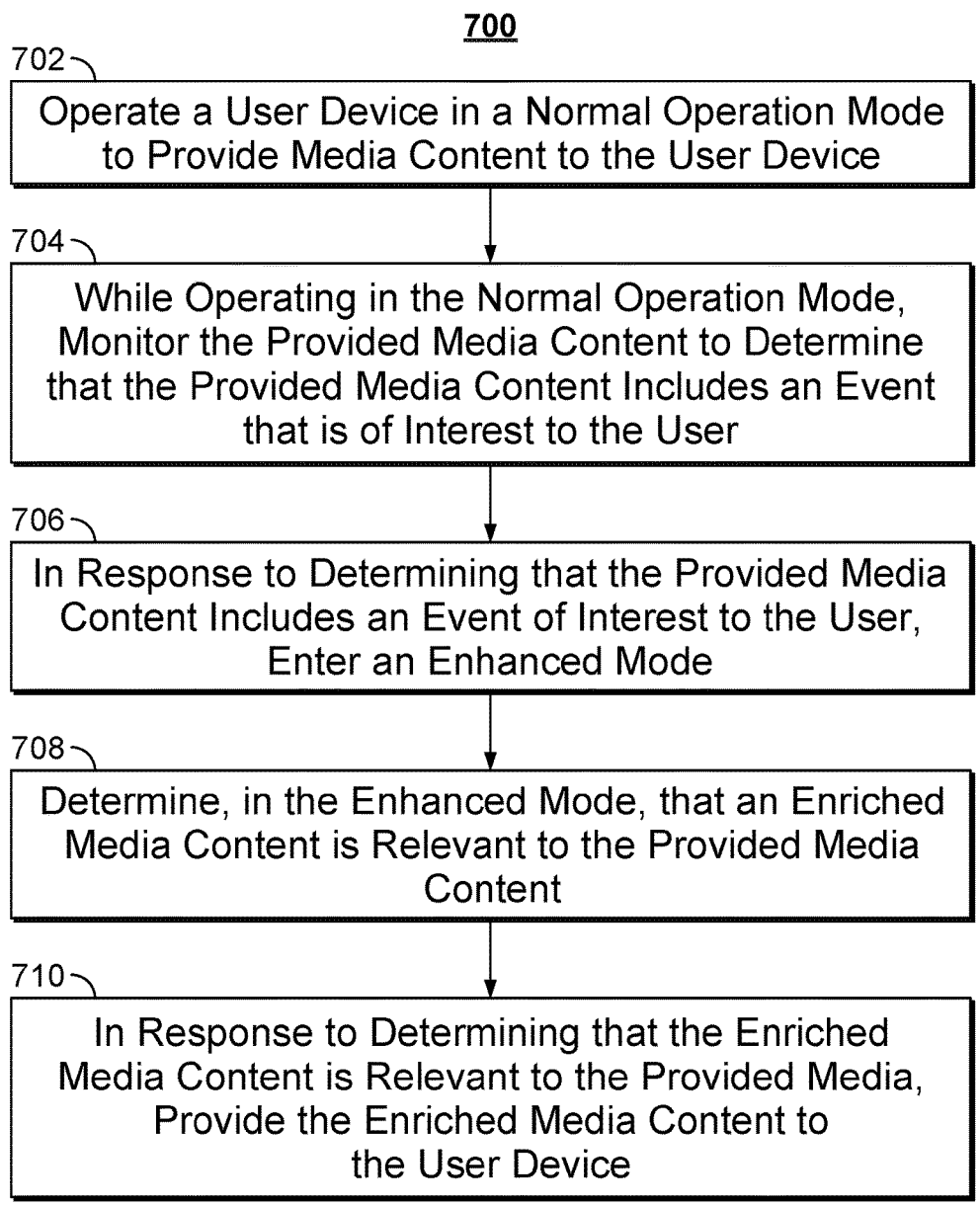
FIG. 7 depicts an illustrative flow diagram for performing user device power conservation by providing the enriched media content to the user device in an enhanced mode in accordance with some embodiments of the disclosure.

FIG. 7 depicts an illustrative flow diagram of a process 700 for performing user device power conservation by providing the enriched media content to the user device in an enhanced mode in accordance with some embodiments of the disclosure. Process 700 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 700 begins at 702, where control circuitry 404 operates in a normal operation mode to provide media content to the user device. In some embodiments, the media content is generated by control circuitry 404 to be displayed on display 412. In some embodiments, control circuitry 404 may deliver the media content from Media Content Source 516. In some embodiments, User Television Equipment 502 may consume less power when control circuitry 404 operates in the normal operation mode.

Process 700 continues to 704, where, in the normal operation mode, control circuitry 404 may monitor the provided media content to determine that the provided media content includes an event that is of interest to the user. For example, control circuitry 404 may determine that the provided media content is an action movie, and that matches previously indicated known user interest in action movies. In another example, control circuitry 404 may determine that a scoring event has occurred in a sports event shown as a part of the provided media content. For example, control circuitry 404 may analyze the provided media content by performing image analyze, facial recognition analysis, image recognition analysis, or voice analysis to determine that a scoring event has occurred. In some embodiments, control circuitry 404 may access supplemental data, such data from internet sources or social media sources to determine that a scoring event has occurred.

Process 700 continues to 706, where, in response to determining that the provided media content includes an event of interest to the user, control circuitry 404 begins operating in an enhanced mode. In some embodiments, User Television Equipment 502 may consume more power when control circuitry 404 operates in enhanced mode. For example, while in enhanced mode, control circuitry 404 may provide additional functionality to User Television Equipment 502, that is not provided during the normal operation mode.

Process 700 continues to 708, where control circuitry 404, while operating in enhanced mode, may determine that an enriched content is relevant to the provided media content. For example, control circuitry 404 may determine that it has available supplemental information or interactive content relevant to the provided media content. For example, control circuitry 404 may determine that the user is currently watching Game of Thrones Season 3 Episode 2, and that supplemental information about Game of Thrones TV show is available at Media Content Source 516.

Process 700 continues to 710, where control circuitry 404, in response to determining that the enriched media content is relevant to the provided media, provides enriched media content to the user device. For example, control circuitry 404 may generate for display enriched content 154, 156, 158 as described in relation to FIG. 1B. In some embodiments, control circuitry 404 may provide enriched content for display to display 412. For example, control circuitry 404 may overlay supplemental information about Game of Thrones TV Show over images from Game of Thrones Season 3 Episode 2 displayed on Display 412.

Figure 8:
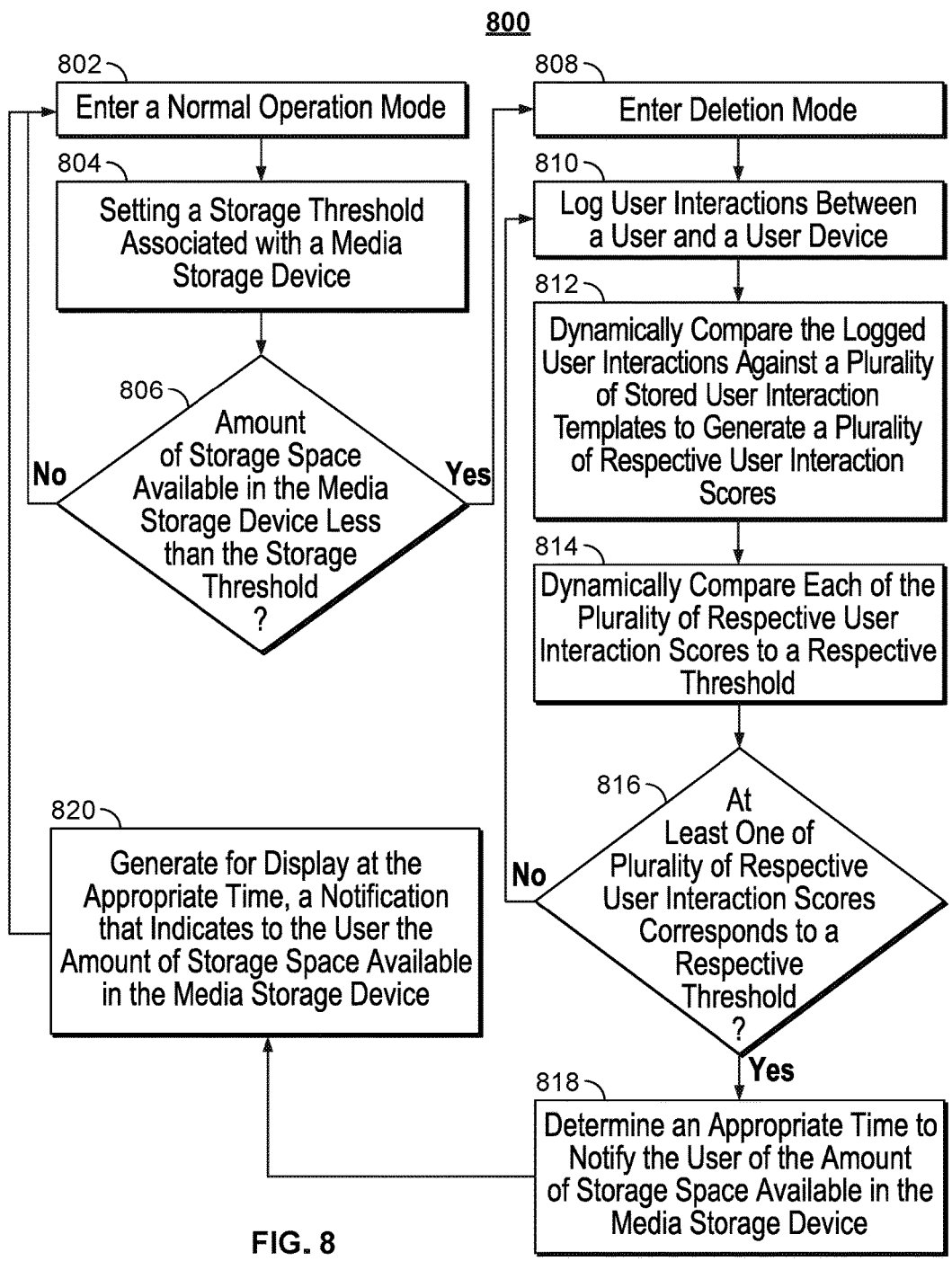
FIG. 8 depicts an illustrative flow diagram for generating for display at the appropriate time, a notification that indicates to the user the amount of storage space available in the media storage device in accordance with some embodiments of the disclosure.

FIG. 8 depicts an illustrative flow diagram of a process 800 for generating for display, at an appropriate time, a notification that indicates to the user the amount of storage space available in the media storage device in accordance with some embodiments of the disclosure. Process 800 may be executed by control circuitry 404, for example, in a manner instructed to control circuitry 404 by the media guidance application.

Process 800 begins at 802, wherein control circuitry 404 enters a normal operation mode. During the normal operation mode, control circuitry 404 may perform a first limited set of operations. For example, control circuitry 404 may limit the advanced functionalities that may be provided to User Television Equipment 502. For example, control circuitry 404 may not provide any kind of storage space notifications to the user in the normal operation mode. In some embodiments, User Television Equipment 502 may consume less power when control circuitry 404 operates in the normal operation mode. For example, less power is consumed because fewer functionalities are provided by control circuitry 404.

At 804, while operating in the normal operation mode, control circuitry 404 may set a storage threshold associated with a media storage device. For example, media storage device may be a DVR device. In some embodiments, media storage device may be any device of User Televisions Equipment 502. In some embodiments, the threshold may be defined as percentage of space available on the media storage device. For example, the threshold may be 10% or less space being available on the media storage device. In some embodiments, the threshold may be set by the user via User Input Interface 410. In some embodiments, the threshold may pre-defined, or may be dynamically set by control circuitry 404.

At 806, while operating in the normal operation mode, control circuitry 404 may monitor storage space available at the media storage device. For example, control circuitry 404 may determine whether an amount of storage space available in the media storage device is less than the storage threshold. For example, control circuitry 404 may determine that media storage device has 9% of space available, while the threshold is 10% of space being available. If the Amount of storage space available in the media storage device is more than the storage threshold, control circuitry 404 may return to block 802 and continue operating in the normal operation mode. If the amount of storage space available in the media storage device is more than the storage threshold, control circuitry 404 may proceed to block 806.

At 808, control circuitry 404 may enter a deletion mode in response to determining that the amount of storage space available in the media storage device is less than the set storage threshold. For example, if media storage device has 9% of space available, while the threshold is 10% of space being available, control circuitry 404 may enter the deletion mode. In the deletion mode, control circuitry 404 may perform an additional set of operation together with the first set of operations that are performed in the normal operation mode. For example, control circuitry 404 may perform operations related to displaying a notification that indicates to the user the amount of storage space available in the media storage device.

In some embodiments, User Television Equipment 502 may consume more power when control circuitry 404 operates in the deletion mode. For example, more power is consumed because more functionalities are provided by control circuitry 404. For example, control circuitry 404 may provide a Storage Space Information Interface 104 for display only during the deletion mode.

At 810, control circuitry 404, while operating in deletion mode, may log user interactions between a user and a user device. For example, control circuitry 404 may log user input at user interface 410. For example, control circuitry 404 may log channel changes, volume changes, content requests, social media interactions, facial movements, verbal commentary by the user, conversations, phone calls, and any other user interactions. For example, control circuitry 404 may log that the user is switching channels with high frequency, or that the user has completely muted the sound, which may indicate lack of user interest. In some embodiments, control circuitry 404 may log that the user increased the volume and did not switch channels for an extended period of time, which may indicate high user interest. In some embodiments, control circuitry 404 may log that the user is currently engaged with another device. For example, control circuitry 404 may log that the user is currently using a cellular device. In some embodiments, control circuitry 404 may determine that the user is consuming a meal or is otherwise busy. For example, control circuitry 404 may interface with home automation devices to track the user's activity.

At 812, control circuitry 404 may dynamically compare the logged user interactions against a plurality of stored user interaction templates to generate a plurality of respective user interaction scores. As time goes on, and new user interactions are logged, control circuitry 404 may continue the comparing process. In some embodiments, the user interaction templates may comprise templates that repre-sents expected user interactions of a user who is: watching an advertisement break, surfing channels because he has not found anything interesting to watch, watching unimportant or boring scenes of a movie or TV show, watching a sports game is on a temporary break, watching a dialog oriented scene while being an action fan, watching an irrelevant song in a musical movie, who is not interested in the media content that is being shown on Display 412, or who is highly interested in the media content that is being shown on Display 412.

Control circuitry 404 may generate user interactions based on how well the logged user interactions match each of the stored templates. For example, if the logged user interactions match a template that represents expected user interactions of a user who is watching an advertisement break, the respective "advertisement break" user interaction score may be increased, while a "sports game is on a temporary break" user interaction score may be decreased.

At 814, control circuitry 404 may dynamically compare each of the plurality of respective user interaction scores to a respective threshold. For example, if the "advertisement break" user interaction score corresponds to the respective threshold, control circuitry 404 may be reasonably confident that the user is indeed watching an advertainment break.

At 816, if control circuitry 404 determines that none of the user interactions scores corresponds to the respective threshold, control circuitry 404 may proceed back to block 810 and continue logging user interactions. If control circuitry 404 determines that at least one of the user interactions scores corresponds to the respective threshold, control circuitry 404 may proceed to block 818.

At 818, control circuitry 404 may determine an appropriate time to notify the user of the amount of storage space available in the media storage device, in response to determining that at least one of the plurality of respective user interaction scores corresponds to a respective threshold. For example, control circuitry 404 may determine that a time when "advertisement break" user interaction score corresponds to the respective threshold is an appropriate time to display system notifications, because the user is not occupied with watching anything of importance.

In another example, control circuitry 404 may determine that a time when "cellular device utilization" user interaction score corresponds to the respective threshold is an appropriate time to display system notifications, because the user is clearly not interested in the media content being shown, and is choosing to interact with a cellular device instead. In such cases, a notification may be presented even if the media content otherwise contains interesting scenes.

Similarly, if any other user interaction score matches any of the aforementioned templates, control circuitry 404 may determine that the user is currently receptive to system prompts, and therefore that the current time is an appropriate time to notify the user of the amount of storage space available in the media storage device.

At 820, control circuitry 404 may generate for display at the appropriate time, a notification that indicates to the user the amount of storage space available in the media storage device. For example, control circuitry 404 may generate for display on Display 412 a Storage Space Information Interface 104 as describe in relation to FIG. 1A. The notification may be a pop-up window unobtrusively overlaid over an image displayed on Display 412. In some embodiments, the notification may include an indication of how full or empty a media storage device is and include an option allowing the user to select one or more media assets for deletion. For example, the control circuitry 404 may generate for display the following message "DVR is 95% full" or "Only 5% of DVR space is available." In some embodiments, control circuitry 404, after generating the notification, may proceed to block 802 and re-enter the normal operation mode.

Figure 9:
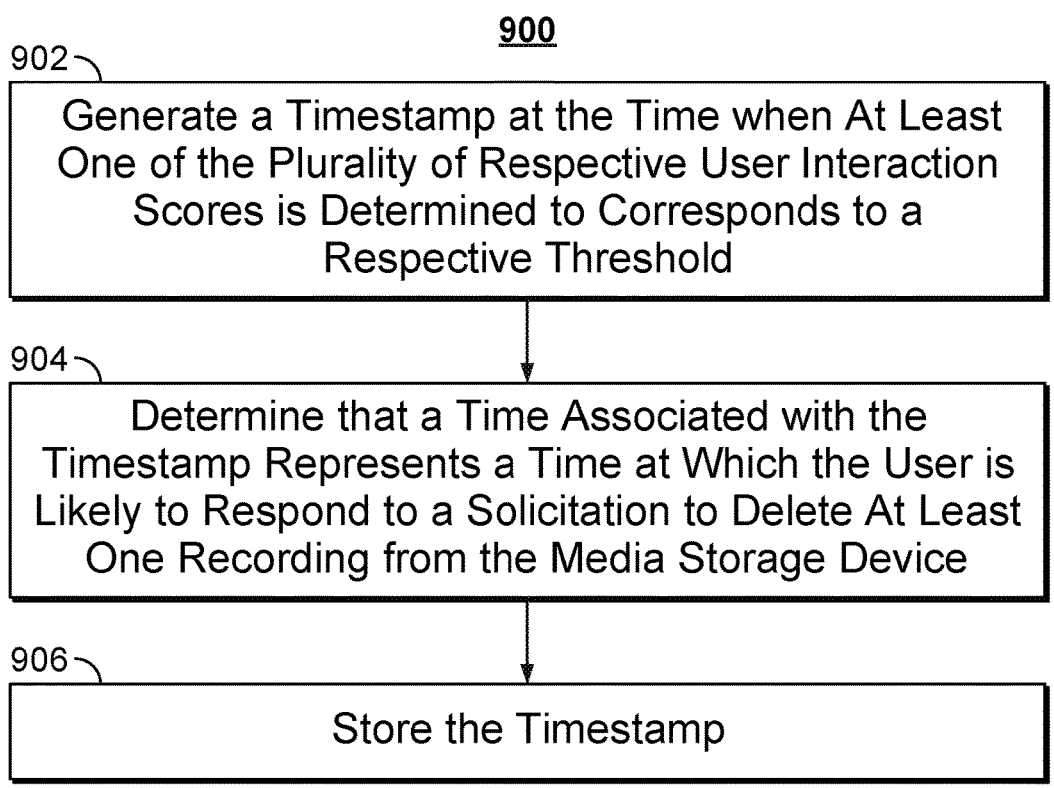
FIG. 9 depicts an illustrative flow diagram for determining the appropriate time to notify a user of the amount of storage space available in a media storage device in accordance with some embodiments of the disclosure.

FIG. 9 depicts an illustrative flow diagram of a process 900 for determining the appropriate time to notify a user of the amount of storage space available in a media storage device in accordance with some embodiments of the disclosure. Process 900 may be executed by control circuitry 404 (e.g., in a manner instructed to control circuitry 404 by the media guidance application). In some embodiments, control circuitry 404 may perform, process 900 as a part of block 818 described in relation to FIG. 8.

Process 900 begins at 902, wherein control circuitry 404 may generate a timestamp at the time when at least one of the plurality of respective user interaction scores is determined to correspond to a respective threshold, as described, for example in block 814 of FIG. 8. For example, if the interaction score is determined to correspond to a respective threshold at time T, control circuitry 404 may generate a timestamp indicative of time T.

At 904, control circuitry 404, may determine that a time associated with the timestamp represents a time at which the user is likely to respond to a solicitation to delete at least one recording from the media storage device. In some embodiments, the determination may be made based on the type of a user interaction score that was determined to corresponds to a respective threshold. For example, if the user interaction score was an "advertainment" interaction score, control circuitry 404 may determine that the user is likely to respond to a solicitation to delete at least one recording from the media storage device. In some embodiments, control circuitry 404 may also consider other factors, such as time of day, known user preferences, or any other factor. For example, if the time associated with timestamp is early in a morning, control circuitry 404 may determine that that the time indicated by the timestamp does not represents a time at which the user is likely to respond to a solicitation to delete at least one recording from the media storage device, because the user is usually too busy in the mornings. At 904, control circuitry 404 may store the generated timestamp. For example, control circuitry 404 may store the timestamp using storage 408.

Figure 10:
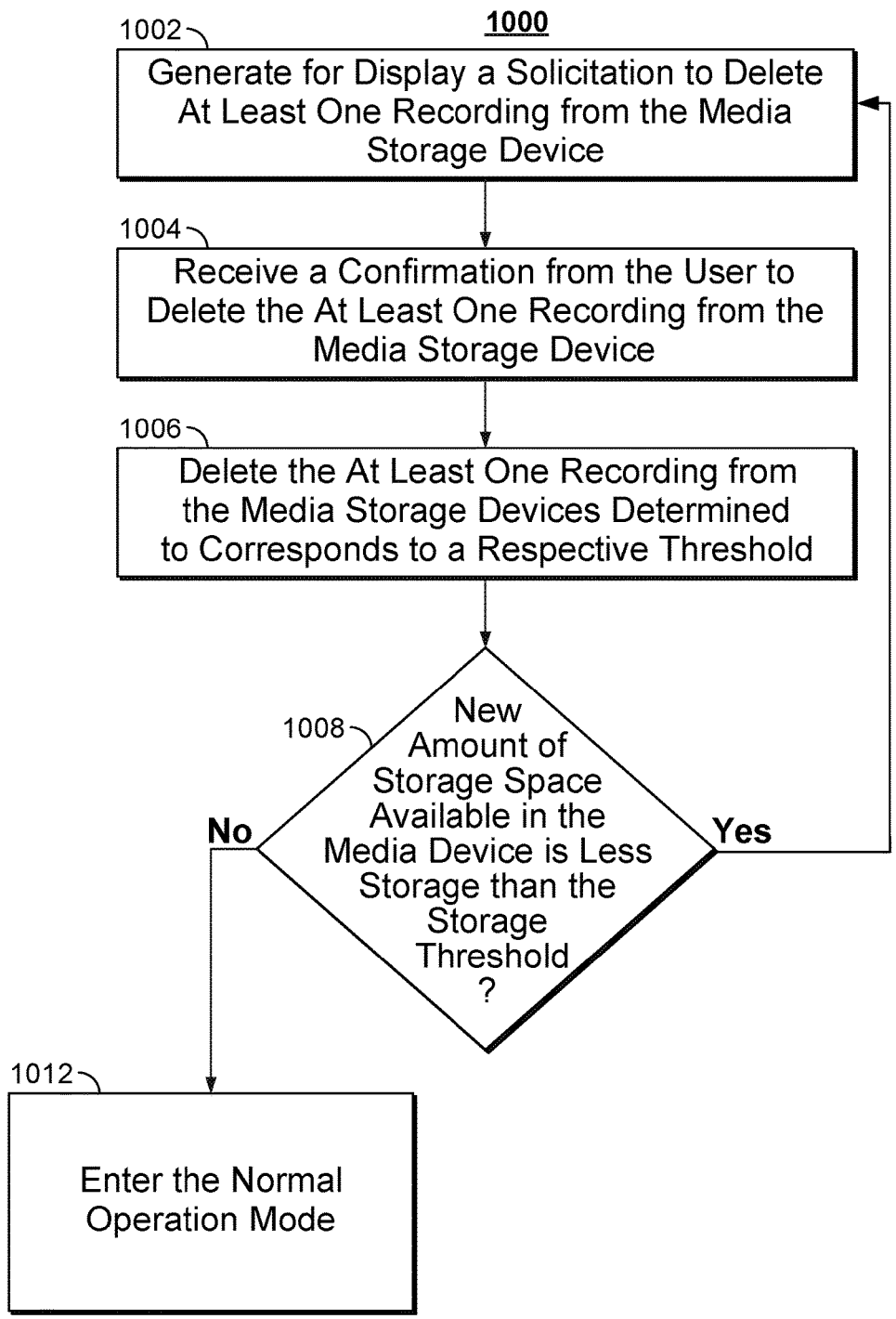
FIG. 10 depicts an illustrative flow diagram for process for deleting recordings from a media storage device in accordance with some embodiments of the disclosure.

FIG. 10 depicts an illustrative flow diagram of a process 1000 for generating for display, at an appropriate time, a notification that indicates to the user the amount of storage space available in the media storage device in accordance with some embodiments of the disclosure. Process 1000 may be executed by control circuitry 404 (e.g., in a manner instructed to control circuitry 404 by the media guidance application). In some embodiments, control circuitry 404 may perform, process 1000 as a part of block 820 described in relation to FIG. 8.

Process 1000 begins at 1002, wherein control circuitry 404 generates for display a solicitation to delete at least one recording from the media storage device. In some embodiments, control circuitry 404 generates for display a solicitation to delete at least one recording from the media storage device as part of generating for display at the appropriate time, a notification that indicates to the user the amount of storage space available in the media storage device. In some embodiments, control circuitry 404 generates solicitation to delete at least one recording from the media storage device by generating for display 100 Storage Space Information Interface 104 as described in relation to FIG. 1A.

In some embodiments, control circuitry 404 may determine which recoding on the media storage device has the lowest priority to the user. For example, control circuitry 404 may determine what is the oldest recording on the media storage device. In some embodiments, control circuitry 404 may determine what is the least watched recording on the on the media storage device. In some embodiments, any other technique may be used to determine what recoding on the media storage device has the lowest priority to the user. In some embodiments, displayed solicitation to delete at least one recording from the media storage device may include a solicitation to delete the recording from the media storage device that has the lowest priority to the user. In some embodiments, displayed solicitation to delete at least one recording from the media storage device may include a suggested reason for why that recording was nominated for deletion.

In some embodiments, control circuitry 404 may generate for display a solicitation to delete at least one recording from the media storage device may include generating for display User Input Field 106 as described in relation to FIG. 1A. For example, the displayed solicitation to delete at least one recording from the media storage device may include a "yes" button and a "no" button.

At block 1004, control circuitry 404 may receive a conformation from the user to delete the at least one recording from the media storage device. For example, the user may click the "yes" button. In some embodiments, the user input may be received by control circuitry 404 via User Input Interface 410.

At block 1006, control circuitry 404 may delete the selected recording from the media storage device in response to receiving a confirmation from the user. In some embodiments, control circuitry 404 may delete the selected recording from a DVR that is a part of User Television equipment 502. For example, in response to detecting that the user has clicked the "yes" button on User Input Field 106, control circuitry 404 may delete the recording that is identified by Storage Space Information Interface 104. In some embodiments, in response to the deletion, control circuitry 404 may re-enter the normal operation mode, for example by returning to block 802 of FIG. 8. In some embodiments, in response to the deletion, control circuitry 404 may proceed to block 1008.

At block 1008, control circuitry 404 may, in response to deleting the at least one recording from the media storage device, determine whether a new amount of storage space available in the media storage device is less than the storage threshold. This step may be performed because deleting a recording changes the amount of space available on the media storage device. The comparison to a threshold may performed in a manner similar to that describe with relation to block 806 of FIG. 8. In response to determining that the amount of storage space available in the media storage device is less than the set storage threshold, control circuitry 404 may generate for display solicitation to delete at least one other recording from the media storage device. Control circuitry 404 may then return to block 1002 and repeat steps 1002, 1004, 1006 with respect to the other recording from the media storage device. In some embodiments, the other recording may be selected by circuitry 404 by determining which recoding on the media storage device has the lowest priority to the user. In some embodiments, process 1000 may repeat blocks 1002, 1004, 1006, and 1008 may until the new amount of storage space available in the media storage device is determined by control circuitry 404 to be more than the set storage threshold. In that case, process 1000 may proceed to block 1012.

In block 1012, control circuitry 404 may enter the normal operation mode in response to determining that the new amount of storage space available in the media storage device is more than the set storage threshold. For example, control circuitry 404 may determine that media storage device has 11% of space available, while the threshold is 10% of space being available. In some embodiments, control circuitry 404 may enter the normal operation by proceeding to block 802 of FIG. 8. In some embodiments, control circuitry 404 may enter the normal operation mode in response to determining that all the user interaction scores no longer correspond to the respective thresholds, as explained with respect to block 816 of FIG. 8. For example, an advertainment break may be over, and the "advertainment break" interaction score may no longer correspond to its threshold.

Figure 11:
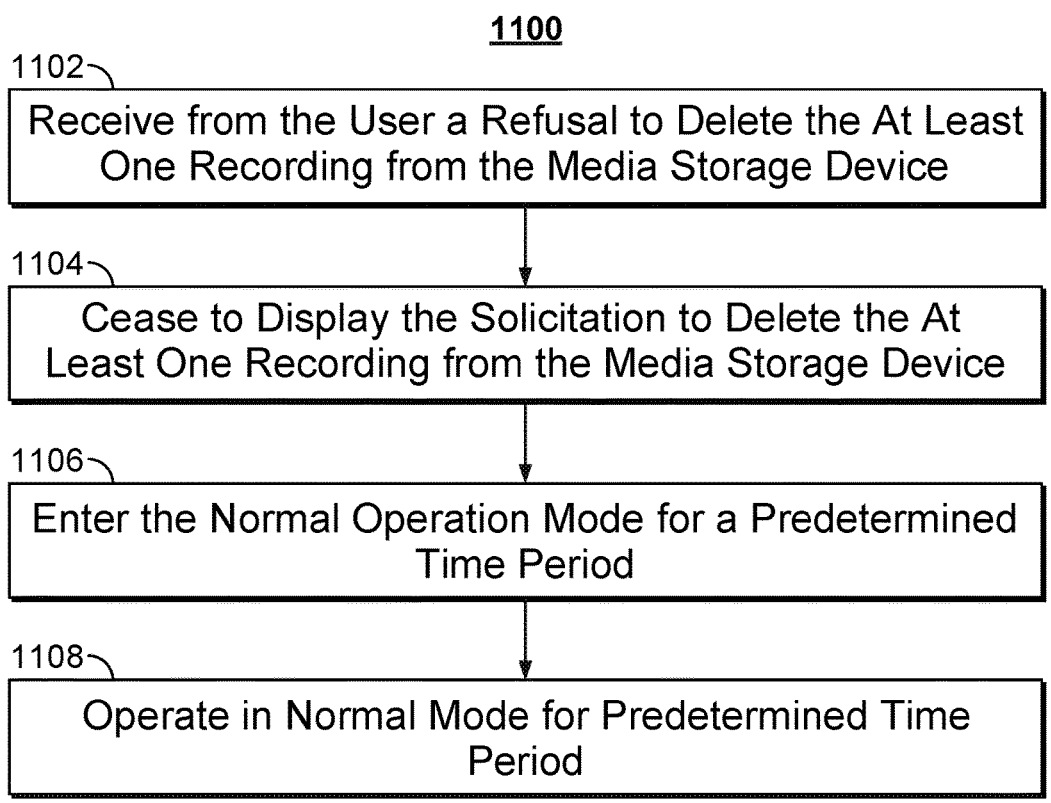
FIG. 11 depicts an illustrative flow diagram for ceasing to display a solicitation to delete at least one recording from a media storage device in accordance with some embodiments of the disclosure.

FIG. 11 depicts an illustrative flow diagram of a process 1100 for ceasing to display a solicitation to delete at least one recording from a media storage device in accordance with some embodiments of the disclosure. Process 1100 may be executed by control circuitry 404 (e.g., in a manner instructed to control circuitry 404 by the media guidance application). In some embodiments, control circuitry 404 may perform, process 1100 after performing block 1002 described in relation to FIG. 10.

At block 1002, control circuitry 404 may receive from the user a refusal to delete the at least one recording from the media storage device. For example, control circuitry 404 may detect that the user has clicked the "no" button displayed on User Input Field 106. In some embodiments, the refusal to delete the at least one recording from the media storage device may be received by control circuitry 404 via User Input Interface 410.

At block 1104, control circuitry 404 may cease to display the solicitation to delete the at least one recording from the media storage device. Since the user has refused to delete the recording from the media storage device, control circuitry 404 may determine that the user is not in a mood to interact with system prompts.

At block 1106, control circuitry 404 may re-enter the normal operating mode. For example, control circuitry 404 may proceed to block 802 described in relation to FIG. 8. At block 1108, control circuitry 404 may decide not to attempt to re-enter the deletion mode for some predetermined time-period. For example, control circuitry 404 may operate exclusively in the normal operation mode for a predetermined amount of time. For example, control circuitry 404 may operate in the normal operation mode for 24-hour period after receiving a refusal to delete the recording from the media storage device form the user.

Figure 12:
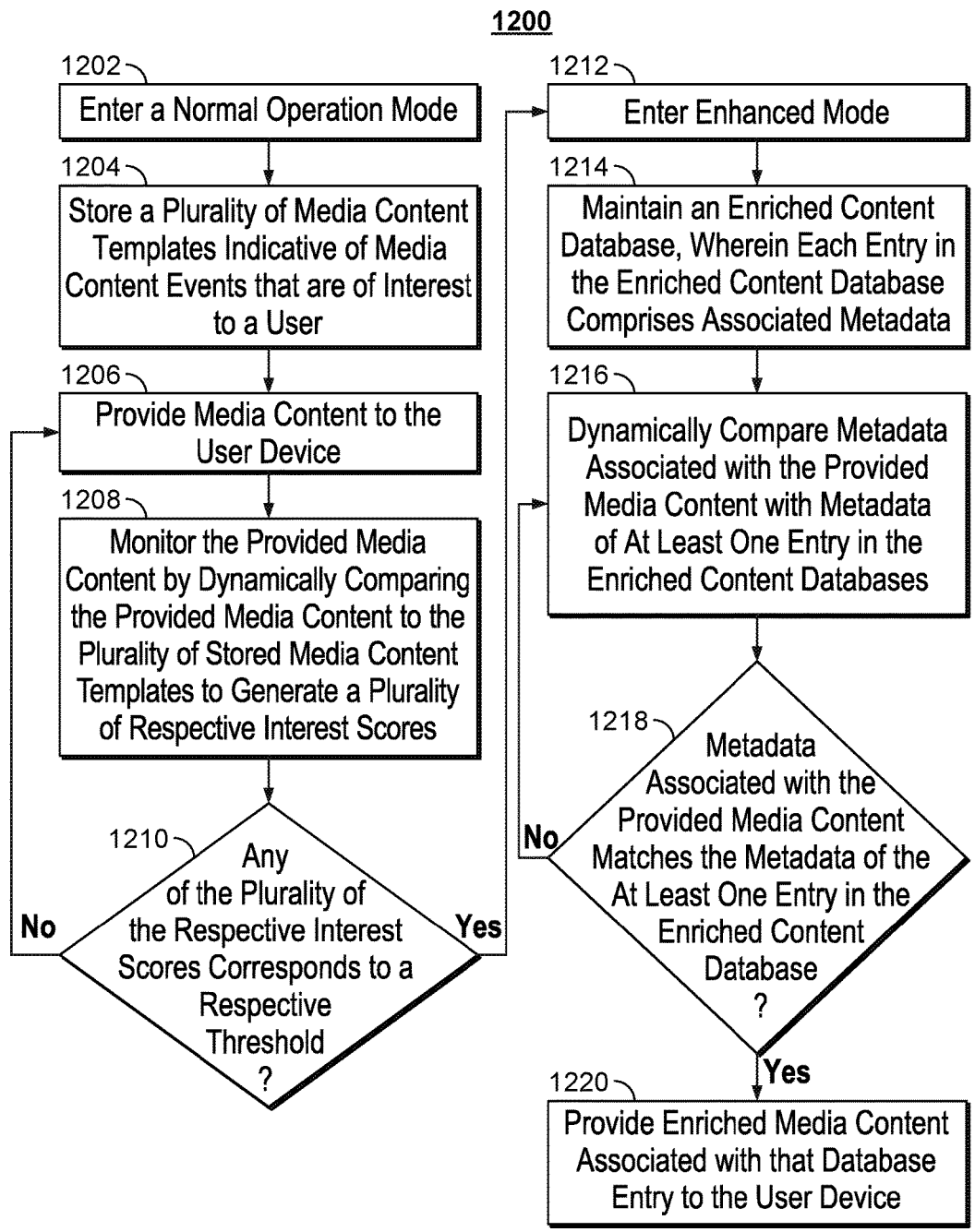
FIG. 12 depicts an illustrative flow diagram for device power conservation using an enhanced mode in accordance with some embodiments of the disclosure.

FIG. 12 depicts an illustrative flow diagram of a process 1200 for device power conservation using an enhanced mode in accordance with some embodiments of the disclosure. Process 1200 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 1200 begins at 1202, wherein control circuitry 404 may enter a normal operation mode. During the normal operation mode, control circuitry 404 may perform a first limited set of operations. For example, control circuitry 404 may limit the advanced functionalities that may be provided to User Television Equipment 502. For example, control circuitry 404 may not provide any kind of enriched media content to User Television Equipment 502. In some embodiments, User Television Equipment 502 may consume less power when control circuitry 404 operates in the normal operation mode. For example, less power is consumed because fewer functionalities are provided by control circuitry 404.

At block 1204, control circuitry 404, while operating in a normal mode, may store a plurality of media content templates indicative of media content events that are of interest to a user. In some embodiments, control circuitry 404 may store the plurality of media content templates in storage 408. In some embodiments, the plurality of media content templates may include: (1) a media content template that represents expected media content characteristics during a key portion of sports event; (2) a media content template that represents expected media content characteristics during a dramatic point of a media asset; (3) a media content template that represents expected media content characteristics during an action movie; or any other media content template.

At block 1206, control circuitry 404 media content to the user device. For example, the media guidance application running on control circuitry 404 may generate a media content for display on a display 412 of user television equipment 502. The media content may be generated for display by way of an explicit user selection to play the video, as a result of the user equipment being powered on, or by any other triggering events.

At block 1206, control circuitry 404 may monitor the provided media content by dynamically comparing the provided media content to the plurality of stored media content templates to generate a plurality of respective interest scores. For example, control circuitry 404 may extract video, audio, and metadata characteristics of the provided media content and compare them to respective video, audio, and metadata characteristics of each of the plurality of stored media content templates. For example, control circuitry 404 may analyze the color, speed, detail, or any other characteristics of the video and audio of the provided media content. Control circuitry 404 may also extract all available metadata of the provided media content. Such as title, length, actors, year of production, etc. Control circuitry 404 may then compare the extracted video, audio, and metadata characteristics of the provided media content to respective video, audio, and metadata characteristics of each of the plurality of stored media content templates. For example, color, speed, detail, or any other characteristics of the video and audio of the may be compared to color, speed, detail, or any other characteristics of the video and audio of the templates.

Control circuitry 404 may further generate interest scores by preforming the aforementioned comparisons. For example, if control circuitry 404 determines that characteristics of the provided media content match a media content template that represents expected media content characteristics during a key portion of sports event, control circuitry 404 may increase the "key sports event" content score.

At block 1210, control circuitry 404 may determine if any of the content scores match a respective threshold. For example, if the "key sports event" content score matches a certain threshold, control circuitry 404 may have a high confidence level that the provided media content depicts an interesting sports event, for example, a goal being scored. If at least one content score matches its threshold, control circuitry 404 may proceed to block 1212. If none of the content scores match their respective threshold, control circuitry 404 may proceed back to block 1206 and continue providing media content to the user device.

At block 1212, control circuitry 404 may enter an enhanced mode in response to determining that at least one interest score of the plurality of interest scores correspond to the respective threshold. For example, control circuitry 404 may enter the enhanced mode in response to determining that the "key sports event" content score matches a certain threshold. In the enhanced mode, control circuitry 404 may perform an additional set of operation together with the first set of operations that are performed in the normal operation mode. For example, control circuitry 404 may perform operations related to providing enriched content to the user device.

In some embodiments, User Television Equipment 502 may consume more power when control circuitry 404 operates in the enhanced mode. For example, more power is consumed because more functionalities are provided by control circuitry 404. For example, control circuitry 404 may provide enriched content to the user device only during the enhanced mode.

In some embodiments, in enhanced mode, control circuitry 404 may activate at least one secondary user device that was powered off during the normal operation mode. For example, the secondary user device may be a digital video recorder, a video camera, and a network connectivity device. For example, the secondary device may be used to enable control circuitry 404 to provide enriched media content to the user device. For example, control circuitry 404 may activate a DVR to recover enriched media content stored on that DVR for delivery to the user device. In another example, control circuitry 404 may activate a network connectivity device to fetch enriched media content over the network.

In some embodiments, in enhanced mode, control circuitry 404 may increase resolution of a display of the user device. For example, control circuitry 404 may increase resolution of display 412. For example, control circuitry 404 may increase the resolution of the user's TV screen from 720p to HD 1080p or 4K resolution.

At block 1214, while operating in deletion mode, control circuitry 404 may maintain an enriched content database, wherein each entry in the enriched content database comprises associated metadata and associated enriched content. For example, enriched content database may be stored on Storage 408 or at Media Content Source 516. In some embodiments, each entry in the database may include associated enriched media content that provides additional information relating to the provided media content or associated enriched media content that provides interactive user experience relating to the provided media content. For example, one exemplary entry in the enriched content database may include additional information relating to NY Giants football team. That exemplary entry may also have meta data describing the nature of the additional information. Meta data may include key words such as "football," "Giants," or any other relevant metadata.

At block 1216, control circuitry 404 may dynamically compare metadata associated with the provided media content with metadata of at least one entry in the enriched content database. For example, if the provided media content is a football Game, control circuitry 404 may extract media data relating to that provided media content. For example, the extracted metadata may include key words like "Football," the score of the game, the date of the game, and any other metadata information. In some embodiments, this extracted metadata is compared to metadata of all entries in the enriched content database.

At block 1218, control circuitry 404 may determine that the metadata associated with the provided media content matches the metadata of the at least one entry in the enriched content database. In that case, control circuitry 404 may proceed to block 1220. In some embodiments, if control circuitry 404 determines that that the metadata associated with the provided media content does not matches the metadata of any entry in the enriched content database, control circuitry 404 may proceed back to block 1216 and continue comparing metadata associated with the provided media content with metadata of at least one entry in the enriched content database, as new media content is being provided.

At block 1220, in response to determining that the metadata associated with the provided media content matches the metadata of the at least one entry in the enriched content database, control circuitry 404 may provide enriched media content associated with that database entry to the user device. For example, if the enriched content database entry that included additional information relating to a Giants football team was matched to the associated with the provided media content, control circuitry 404 may provide that additional information for display on Display 412. In some embodiments, control circuitry 404 may provide enriched media content as Enriched Media Content 154, 156, or 158 as described in relation to FIG. 1B. For example, additional information relating to a Giants football team may be overlaid over Image 152, or displayed alongside Image 152.

Figure 13:
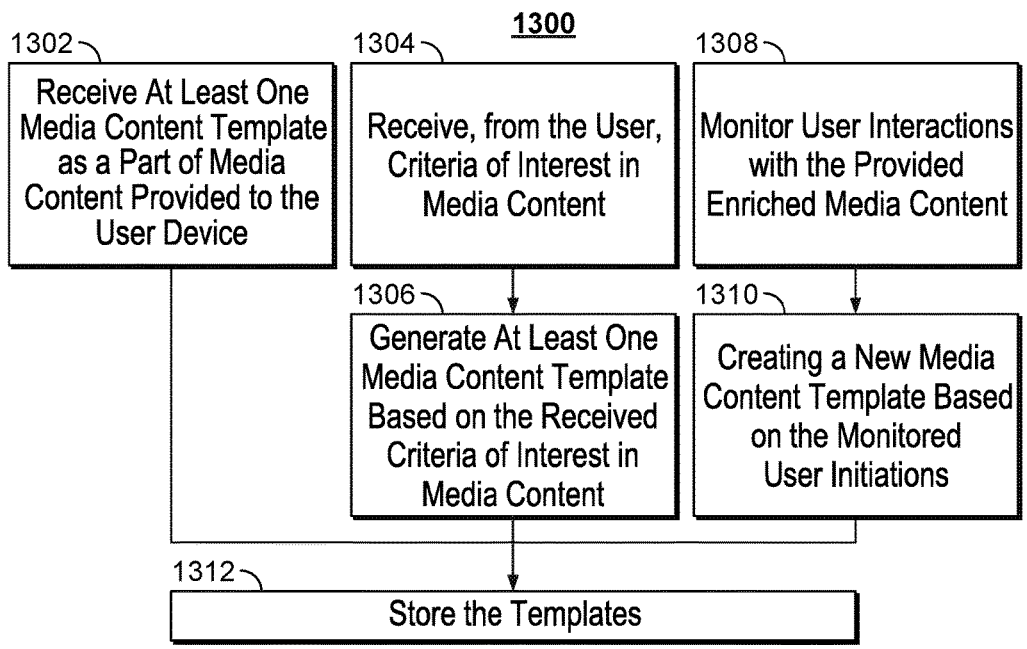
FIG. 13 depicts an illustrative flow diagram for generating and storing media content templates in accordance with some embodiments of the disclosure.

FIG. 13 depicts an illustrative flow diagram of a process 1300 for generating and storing media content templates in accordance with some embodiments of the disclosure. Process 1300 may be executed by control circuitry 404 (e.g., in a manner instructed to control circuitry 404 by the media guidance application). In some embodiments, control circuitry 404 may perform, process 1300 as a part of performing block 1214 described in relation to FIG. 12.

At block 1302, control circuitry 404 may receive at least one media content template as a part of media content provided to the user device. For example, control circuitry 404 may receive a template from Media Content Source 516 or from Media Guidance Source 518. In some embodiments, this template may be based on a user profile that is stored at Content Source 516 or at Media Guidance Source 518.

At block 1304, control circuitry 404 may receive from the user criteria of interest in media content. For example, control circuitry 404 may generate for display a questionnaire during set up of user Television Equipment 502 or at any other time. Control circuitry 404 may receive user response to the questionnaire via User Input Interface 410. For example, the user may indicate genres of media content that the user finds interesting.

At block 1306, control circuitry 404 may in response to receiving the criteria of interest in media content from the user, generate at least one media content template based on the received criteria of interest in media content. For example, if the user indicted that he is interested in sports, control circuitry 404 may generate a template that represents expected media content characteristics during a key portion of sports event.

At block 1306, control circuitry 404 may monitor user interactions with the provided enriched media content (for example, at step 1220 of FIG. 12). For example, control circuitry 404 may monitor user input via User Input Interface 410 that relates to the displayed enriched media content. For example, control circuitry 404 may track how much time the user spends reading supplemental information or on interacting with an interactive user experience.

At block 1310, control circuitry 404 may create a new media content template based on the monitored user initiations. For example, if the user spent a significant amount of time interacting with enriched media content relating to Giants Football team, control circuitry 404 may create a new media content that represents expected media content characteristics during a key portion of sports event.

At block 1312, control circuitry 404 may store the media content templates received at block 1302 or generated at blocks 1306 or 1310. In some embodiments, control circuitry 404 may store the templates in Storage 408.

Figure 14:
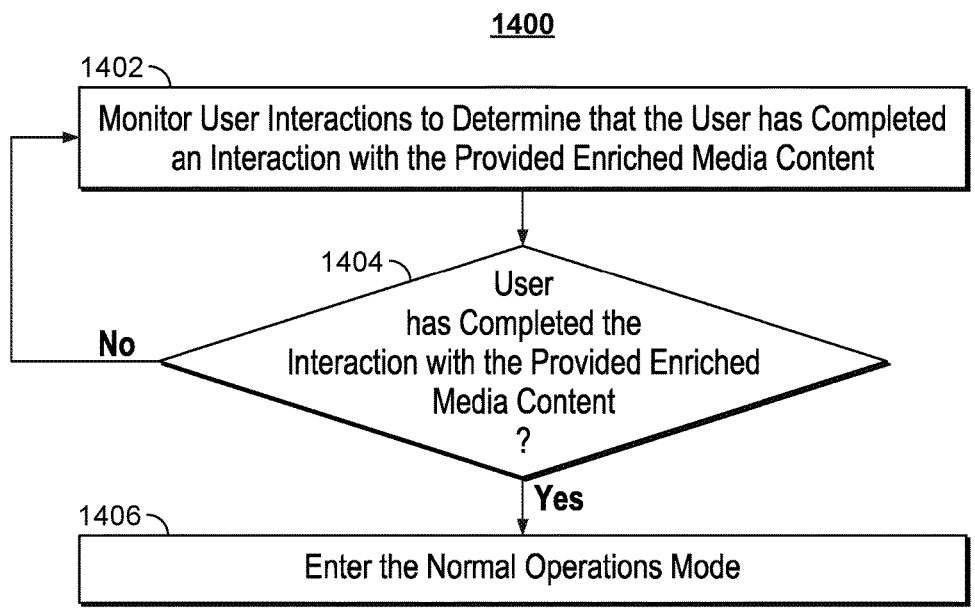
FIG. 14 depicts an illustrative flow diagram for entering a normal operation mode when the user completed an interaction with the provided enriched media content in accordance with some embodiments of the disclosure.

FIG. 14 depicts an illustrative flow diagram for entering a normal operation mode when the user completes an interaction with the provided enriched media content in accordance with some embodiments of the disclosure. Process 1400 may be executed by control circuitry 404 (e.g., in a manner instructed to control circuitry 404 by the media guidance application). In some embodiments, control circuitry 404 may perform, process 1400 after performing block 1220 described in relation to FIG. 12.

At block 1402, control circuitry 404 may monitor user interactions to determine that the user has completed an interaction with the provided enriched media content. In some embodiments, control circuitry 404 may make monitor user input received via user input Interface 410 that relates to interaction with the provided enriched media content that was provided at block 1220 of FIG. 12.

At block 1404, control circuitry 404 may determine that the user has completed the interaction with the provided enriched media content. For example, control circuitry 404 may determine that the user has stopped reading or viewing the supplemental content or has stopped interacting with an interactive user experience.

At block 1404, control circuitry 404 may, in response to determining that the user has completed the interaction with the provided enriched media content, enter the normal operation mode. For example, control circuitry 404 may proceed to block 1202 of FIG. 12. In some embodiments, control circuitry 404 may power off a secondary user device, such as a digital video recorder, a video camera, and a network connectivity device. In some embodiments, control circuitry 404 may decrease resolution of a display of the user device. For example, control circuitry 404 may decrease resolution of display 412. For example, control circuitry 404 may decrease the resolution of user's TV screen from HD 1080 to 720p.

It should be noted that processes 600-1300, or any step thereof could be performed on, or provided by, any of the devices shown in, or described with respect to, FIGS. 4-5. For example, either process 600 or process 700 may be executed by control circuitry 404 (FIG. 4) as instructed by media guidance application(s) implemented on user equipment 502, 504, 506 (FIG. 5). In addition, one or more steps of processes 600 and 700 may be incorporated into, or combined with, one or more steps of any other process or embodiment.

It is contemplated that the steps or descriptions of each of FIGS. 6-13 may be used with any other embodiment of this disclosure. In addition, the steps and descriptions described in relation to FIGS. 6-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 6-13.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for user device power conservation, comprising:
   entering a normal operation mode, wherein during the normal operation mode, a first set of operations is performed; wherein the first set of operations comprises:
   storing a plurality of media content templates indicative of media content events that are of interest to a user;
   providing media content to the user device;
   monitoring the provided media content by dynamically comparing the provided media content to the plurality of stored media content templates to generate a plurality of respective interest scores;
   dynamically comparing each of the plurality of the respective interest scores to a respective threshold;
   entering an enhanced mode in response to determining that at least one interest score of the plurality of interest scores correspond to the respective threshold;
   performing, in the enhanced mode, the first set of operations and an additional set of operations wherein the additional set of operations comprises:
   maintaining an enriched content database, wherein each entry in the enriched content database comprises associated metadata;

comparing metadata associated with the provided media content with metadata of at least one entry in the enriched content database;

in response to determining that the metadata associated with the provided media content matches the metadata of the at least one entry in the enriched content database, providing enriched media content associated with that database entry to the user device.

2. The method of claim 1, wherein the plurality of stored media content templates comprises at least one of: (1) a media content template that represents expected media content characteristics during a key portion of sports event; (2) a media content template that represents expected media content characteristics during a dramatic point of a media asset.

3. The method of claim 1, wherein operations in the enhanced mode expend more power than operations in the normal operation mode.

4. The method of claim 1, wherein storing a plurality of media content templates indicative of media content events that are of interest to a user comprises:
receiving at least one media content template as a part of media content provided to the user device; and
storing the received media content template.

5. The method of claim 1, wherein storing a plurality of media content templates indicative of media content events that are of interest to a user comprises:
receiving, from user, criteria of interest in media content;
in response to receiving the criteria of interest in media content from the user, generating at least one media content template based on the received criteria of interest in media content; and
storing the generated media content template.

6. The method of claim 1, wherein the entries of enriched content database comprise at least one of: (1) enriched media content that provides additional information relating to the provided media content; (2) enriched media content that provides interactive user experience relating to the provided media content.

7. The method of claim 1, wherein the additional set of operations further comprises:
activating at least one secondary user device that was powered off during the normal operation mode; wherein the secondary user device comprises at least one of a digital video recorder, a video camera, and a network connectivity device.

8. The method of claim 1, wherein the additional set of operations further comprises:
enhancing the display resolution of the user device.

9. The method of claim 1, wherein the additional set of operations further comprises:
monitoring user interactions to determine that the user has completed an interaction with the provided enriched media content; and
in response to determining that the user has completed the interaction with the provided enriched media content, entering the normal operation mode.

10. The method of claim 1, wherein the additional set of operations further comprises:
monitoring user interactions with the provided enriched media content;
creating a new media content template based on the monitored user initiations; and
storing the new media content template as a part of the plurality of stored media content templates.

11. A system for user device power conservation, the system comprising:
control circuitry configured to:
enter a normal operation mode, wherein during the normal operation mode, a first set of operations is performed; wherein the first set of operations comprises:
storing a plurality of media content templates indicative of media content events that are of interest to a user;
providing media content to the user device;
monitoring the provided media content by dynamically comparing the provided media content to the plurality of stored media content templates to generate a plurality of respective interest scores;
dynamically comparing each of the plurality of the respective interest scores to a respective threshold;
enter an enhanced mode in response to determining that at least one interest score of the plurality of interest scores correspond to the respective threshold; and
perform, in the enhanced mode, the first set of operations and an additional set of operations wherein the additional set of operations comprises:
maintaining an enriched content database, wherein each entry in the enriched content database comprises associated metadata;
comparing metadata associated with the provided media content with metadata of at least one entry in the enriched content database;
in response to determining that the metadata associated with the provided media content matches the metadata of the at least one entry in the enriched content database, providing enriched media content associated with that database entry to the user device.

12. The system of claim 11, wherein the plurality of stored media content templates comprises at least one of: (1) a media content template that represents expected media content characteristics during a key portion of sports event; (2) a media content template that represents expected media content characteristics during a dramatic point of a media asset.

13. The system of claim 11, wherein operations in the enhanced mode expend more power than operations in the normal operation mode.

14. The system of claim 11, wherein storing a plurality of media content templates indicative of media content events that are of interest to a user comprises:
receiving at least one media content template as a part of media content provided to the user device; and
storing the received media content template.

15. The system of claim 11, wherein storing a plurality of media content templates indicative of media content events that are of interest to a user comprises:
receiving, from user, criteria of interest in media content;
in response to receiving the criteria of interest in media content from the user, generating at least one media content template based on the received criteria of interest in media content; and
storing the generated media content template.

16. The system of claim 11, wherein the entries of enriched content database comprise at least one of: (1) enriched media content that provides additional information relating to the provided media content; (2) enriched media content that provides interactive user experience relating to the provided media content.

17. The system of claim 11, wherein the additional set of operations further comprises:

activating at least one secondary user device that was powered off during the normal operation mode; wherein the secondary user device comprises at least one of a digital video recorder, a video camera, and a network connectivity device.

18. The system of claim 11, wherein the additional set of operations further comprises:
   enhancing the display resolution of the user device.

19. The system of claim 11, wherein the additional set of operations further comprises:
   monitoring user interactions to determine that the user has completed an interaction with the provided enriched media content; and
   in response to determining that the user has completed the interaction with the provided enriched media content, entering the normal operation mode.

20. The system of claim 11, wherein the additional set of operations further comprises:
   monitoring user interactions with the provided enriched media content;
   creating a new media content template based on the monitored user initiations; and
   storing the new media content template as a part of the plurality of stored media content templates.

* * * * *